April 11, 1944. R. E. HARRIS 2,346,375
FILTER PRESS AND CONTROL MECHANISM THEREFOR
Filed Aug. 31, 1940 2 Sheets-Sheet 1
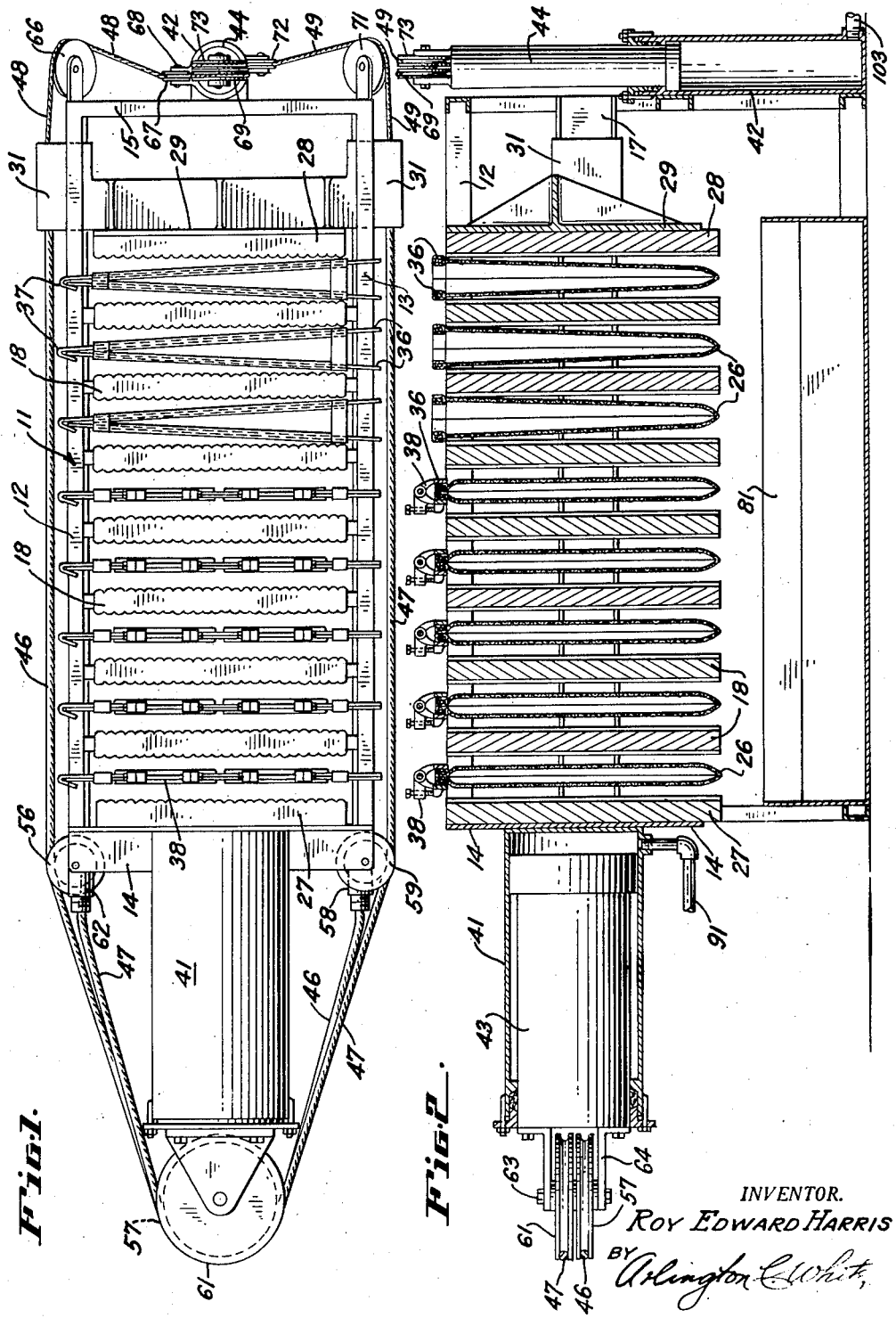
INVENTOR.
ROY EDWARD HARRIS
BY
ATTORNEY.

April 11, 1944. R. E. HARRIS 2,346,375
FILTER PRESS AND CONTROL MECHANISM THEREFOR
Filed Aug. 31, 1940 2 Sheets-Sheet 2
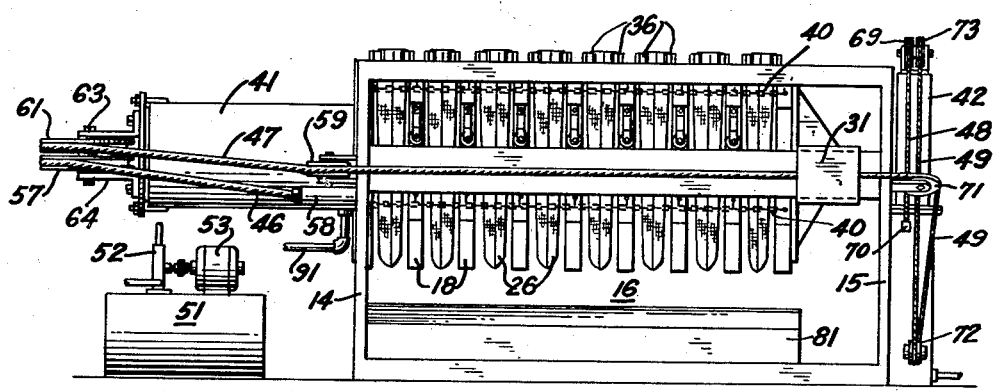
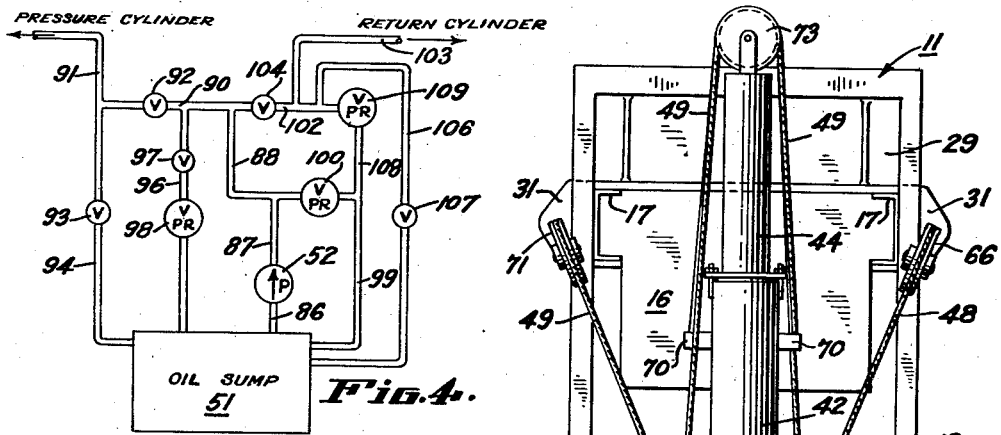
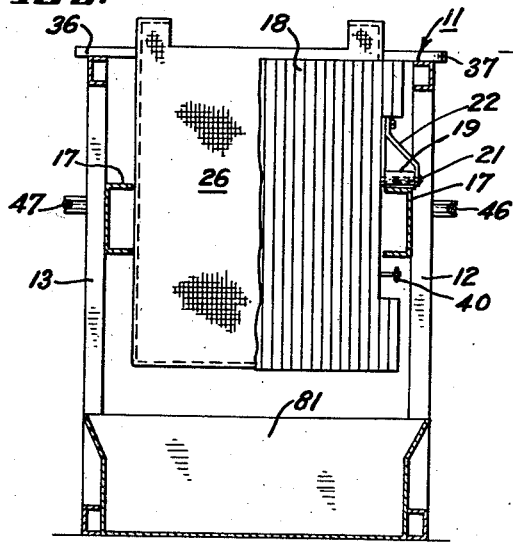
INVENTOR.
Roy Edward Harris
BY
ATTORNEY.

Patented Apr. 11, 1944

2,346,375

UNITED STATES PATENT OFFICE 2,346,375

FILTER PRESS AND CONTROL MECHANISM THEREFOR

Roy Edward Harris, San Jose, Calif.

Application August 31, 1940, Serial No. 354,952

1 Claim. (Cl. 100—50)

The invention, in general, relates to means for recovering sugar values from culls as well as from cannery waste and trimmings. More particularly, the invention relates to hydraulically controlled filter presses.

A number of various types of filter presses have been developed heretofore for adaptation to different arts and for effecting, in general, the extraction of liquids from pulpy masses or from semi-solids. More than a majority of these prior filter presses have proven somewhat unsatisfactory in accomplishing their purpose in a minimum of time and with a minimum of operations and labor. The present invention is directed towards overcoming certain disadvantageous features in filter press construction and operation, the invention being a part of a complete process, including purification steps and refining, for the recovery of sugar values from cannery waste and trimmings; such process being more fully disclosed in my co-pending application bearing Serial No. 370,172, filed December 14, 1940 and entitled Process of producing natural fruit juices and of eliminating cannery waste and which has issued as Patent No. 2,320,036, dated May 25, 1943.

A primary object of my invention is to provide an improved filter press affording the handling of an increased volume of pulp and slurry in a minimum of time with a minimum of operations and less labor.

Another object of the invention is to provide relatively simple hydraulic mechanism in a filter press for positively exerting desired pressures as well as for returning the press to initial condition rapidly and effectively for receiving additional material, all with the highest degree of safety to the operator.

A still further object of my improvement is to provide a filter press and control mechanism therefor of the indicated nature which is additionally characterized by its simplicity of construction and ease of installation.

The foregoing and other objects are attained in a preferred embodiment of my invention which is illustrated in the accompanying drawings. It is to be understood that I am not to be limited to the precise embodiment shown, nor to the precise arrangement of elements, as my invention, as defined in the appended claim, can be embodied in a plurality and variety of forms.

Referring to the drawings:

Figure 1 is a top plan view of a preferred embodiment of the invention.

Figure 2 is a side elevational view, for the most part in section, of the preferred embodiment of the invention.

Figure 3 is a reduced, side elevational view of the embodiment shown in Figures 1 and 2, with one side of the case removed to illustrate the construction.

Figure 4 is a diagrammatic view of the pipe circuit for the hydraulic control mechanism of the preferred embodiment of the invention.

Figure 5 is an end elevational view, partly in section, illustrating a portion of the hydraulic control mechanism of the embodiment of Figures 1 to 3, inclusive.

Figure 6 is another elevational view of the preferred embodiment, partly in section and partly broken away for purposes of illustrating certain elements thereof.

In its preferred form, the filter press and control mechanism therefor of my invention preferably comprises a frame defining an elongated chamber, a series of porous, filter bags movably suspended on said frame and depending into said chamber, a series of flexibly connected pressboards alternately arranged with respect to said bags and movably mounted on said frame within said chamber, together with means for applying pressure to an end board of said series of boards to compress all of said bags between said boards, and means connected to one of said press boards for returning said bag and said boards to their initial positions in one operation.

As particularly illustrated in Figures 1 and 2 of the drawings, the preferred embodiment of my invention comprises a frame 11 including a pair of sides 12 and 13 connecting a pair of ends 14 and 15, the frame defining an elongated chamber 16. On the inner surface of each of the sides 12 and 13 of the frame, I provide a track 17 which is substantially co-extensive with the length of the chamber 16 and I utilize the tracks 17 for movably suspending a plurality or series of press-boards thereon. Preferably, the suspension of each board on the tracks 17 is effected through the medium of rollers 19 which are rotatably mounted on pins 21 carried by bifurcated brackets 22 secured to opposite sides of each pressboard, as clearly depicted in Figure 6 of the drawings. The suspension of each press-board in this manner not only affords movement of the boards longitudinally of the chamber 16, by virtue of rollers 19 riding on tracks 17, but also pivotal or swinging movement about the pins 21 which are approximately located on the horizontal axis of each of the boards at each side thereof. This pivotal mounting of each press board 18 enables more effective distribution of applied pressure from the top of the filter bags downwardly to their bottoms, as hereinafter explained. In order to enhance the draining of expressed liquid to the bottom of the press, I preferably provide press-boards 18 having fluted side surfaces defining grooves for passing the liquid more rapidly.

The preferred embodiment of the invention also includes a series of filter bags 26 which are made of a suitable porous fabric and which, as shown in Figures 1 and 2 of the drawings, are alternately disposed with respect to press boards 18. While I have depicted nine press boards and eight filter bags in the press illustrated, it is clear that these elements may be increased in the same ratio to the extent desired within space limitations. The arrangement of alternately disposed press boards and filter bags provides a press board at each end of the chamber 16 of which one end board 27 is rigidly secured by means of suitable fastening elements to end 14 of the frame, while the other end board 28 is fixedly secured to a follower or head 29 adjacent end 15 of the frame, the head or follower 29 spanning chamber 16 and having side, channeled guides 31 thereon for slidable engagement with tracks 17. As illustrated, each filter bag 26 is suspended from the top of frame 11 and across chamber 16 by means of a pair of bars 36 secured in the top of each bag. One of bars 36 is provided with a hooked end 37 defining a notch for receiving the end of the other bar and thus serving to swing the bags open and shut. The bars 36, with the bags closed, are held tightly together by suitable clamps 38 to prevent overflow of material upon application of pressure.

In accordance with my invention, hydraulically controlled means are provided for applying pressure to the series of filter bags 26 to express liquid from the material disposed therein, such means also serving to return the series of bags and press boards 18 to initial positions for successive filling of bags and compressing the same. In addition to a pair of chains 40 flexibly connecting the series of press boards 18 together at opposite sides of the press, these means preferably include a pair of cylinders 41 and 42 mounted exteriorly of frame 11 at opposite ends thereof; pistons 43 and 44 movably mounted in cylinders 41 and 42, respectively; together with a pair of cables 46 and 47 associated with cylinder 41 and a pair of cables 48 and 49 associated with the cylinder 42. For convenience of description, cylinder 41 will be hereinafter termed the pressure cylinder, and the cylinder 42 will be termed the return cylinder. These means also include a source of fluid, such as a sump 51 which preferably contains oil, and a suitable pump 52 together with requisite valve controlled pipes and suitable pipe connections for withdrawing fluid from sump 51 and introducing the same into the cylinders 41 and 42 successively and recurrently, as desired, in back of the pistons 43 and 44 thereof, respectively; the pump 52 being driven by any suitable prime mover, such as an electric motor 53. As particularly illustrated in Figure 1 of the drawings, cables 46 and 47, which are associated with pressure cylinder 41, are anchored to opposite sides of the follower or head 29, while cables 48 and 49, which are associated with return cylinder 42, are also connected or anchored to opposite sides of the follower 29. More specifically, cable 46 extends from follower 29 towards cylinder 41 along the frame 11 over a pulley 56 which conveniently is mounted on end 14 of the frame, and thence over a pulley 57 carried by piston 43 of cylinder 41 to the opposite side of the frame where it is anchored to a lug 58 on end 14 of the frame. Similarly, cable 47 extends from follower or head 29 towards cylinder 41 over a pulley 59 mounted on end 14 of the frame, and thence over a pulley 61 carried by the piston 43 to the opposite side of the frame where it is anchored to a lug 62 on end 14 of the frame. As especially shown in Figures 2 and 3 of the drawings, the pulleys 57 and 61 are conveniently mounted for rotation on a pin 63 supported across a pair of brackets 64 which are secured to and extend from the piston 43.

With reference to the cables 48 and 49 associated with the return cylinder 42, it will be observed that cable 48 extends from follower 29 along the frame towards the cylinder 42 over a pulley 66 mounted on the frame, and thence over a lower pulley 67 journaled in cross-arms 68 extending from cylinder 42, thence over a pulley 69 carried by the piston 44 of cylinder 42 to the opposite side of the cylinder where it is anchored to a cross-bar 70 extending from the cylinder. Similarly, the cable 49 extends from follower 29 on the opposite side to cable 48 and over a pulley 71 mounted on the end of the frame, thence over a lower pulley 72 journaled on cross-arms 68 opposite to pulley 67, and thence over a pulley 73 carried by the cylinder piston 44 to the opposite side of the cylinder where it is anchored to crossbar 70 opposite to the point of anchorage of the cable 48. The mounting of pulleys 69 and 73 on piston 44 is similar to the mounting of pulleys 57 and 61 on piston 43. Since cables 48 and 49 are not required to do the same amount of work as the cables 46 and 47, the former can be and are of lighter construction, or fewer strands, than the latter, as indicated by the comparative thicknesses of the two sets of cables in the accompanying drawings.

In the operation of the press, it is to be understood that one or more tanks of slurry or fruit pulp are supported on suitable platforms adjacent to and above the press, and that a suitable swinging conduit is connected to the outlets of the tanks, for filling the filter bags 26 successively, such tanks, valve controlled swinging conduit and platform not being shown as they are not, per se, a part of my invention but conventional practice. After all of the bags 26 have been filled with the material from which it is desired to extract juices, each bag is closed by means of the bars 36 and clamps 38. The press boards 18, at the completion of the filling operation, are in the positions indicated in Figure 1 of the drawings with no pressure applied to the intermediate filter bags. After the bags have been filled, fluid is pumped from sump 51 into pressure cylinder 41 in back of the piston 43 thereof, and thus moving the piston out of the cylinder. In actual practice, where a press is employed having eight filter bags, I have found it desirable and advantageous to pump the fluid into the cylinder 41 under a pressure of approximately 400 pounds per square inch on the initial compressing stage, and then extend such pressure to approximately 600 pounds per square inch rapidly to complete the final squeezing of the bags and extract the greatest possible amount of juice therefrom. It will be appreciated that as the piston 43 of pressure cylinder 41 moves outwardly, and by virtue of the connections between the piston 43 and the head or follower 29 consisting of the cables 46 and 47, the follower 29 is drawn toward end 14 of the frame and the filter bags are compressed between the boards. It also will be appreciated that by virtue of the pivotal mounting of the press boards 18 between the two end boards 27 and 28, the intermediate boards will follow the contour of the bags and the applied pressure will be distributed from the top of the bags to the bottoms thereof. The expressed liquid from the filter bags drains into a receptacle or tank 81 at the bottom of chamber 16, the fluted surfaces of the press boards facilitating passage of liquid into the tank 81 that issues from the sides of the bags. Suitable pumping equipment, not shown, is employed for transferring expressed liquid from tank 81 to other tanks for purification thereof and further treatment in accordance with my above mentioned process.

After the completion of the pressing action, the fluid pressure upon piston 43 of cylinder 41 is relieved and the fluid returned to the sump 51. Simultaneously, fluid is delivered by pump 52 to return cylinder 42 in back of its piston 44 to project the piston from the cylinder. This action effects the return of the press boards 18 and filter bags 26 to their initial positions by virtue not only of the chain connections 40 between the press boards but also by virtue of the cable connections 48 and 49 between the piston 44 and the follower 29. Since the work required to be done to return the elements to their initial positions is not as great as that required to compress the bags 26, the fluid pressure on piston 44 is far less than that applied to the piston 43 of the pressure cylinder. I have found that a fluid pressure in the neighborhood of 50 pounds per square inch is effective for this purpose. The foregoing described cycle is repeated again and again until the supply of material to be compressed is consumed, it being understood that in every instance of applying fluid pressure to one cylinder to project its piston, the fluid pressure is relieved from the other cylinder to permit its piston to seat therein. It may be observed here that two presses can be arranged side by side with an intervening platform so that a single workman can fill first one press and then the other while the compressing operation is being performed on the other.

In Figure 4 of the drawings, I have diagrammatically illustrated the piping and valve arrangement for the pressure control mechanism of my improved filter press. The pump 52 is designed for applying a maximum fluid pressure of approximately 600 pounds per square inch, more or less, which is the pressure utilized on the final compressing operation to express the greatest amount of liquid from the material placed in the filter bags 26. The fluid system includes a main and auxiliary valve associated with return cylinder 42, as well as a final pressure valve associated with pressure cylinder 41. To this end, I provide a pipe 86 leading from the sump 51 to the inlet of pump 52, and a series of pipes 87, 88, 90 and 91 leading from the pump outlet to the pressure cylinder 41. A main valve 92 for pressure cylinder 41 is conveniently inserted in pipe 90 and an auxiliary valve 93 is inserted in a return pipe 94 leading from pressure cylinder 41 to the sump 51. The system includes a by-pass 96 leading conveniently from pipe 90 to sump 51 and I provide a final pressure valve 98 therein, the latter being regulated to open whenever the pressure attains a value in excess of 400 pounds per square inch which is the pressure value employed on the initial compressing action for the press of the embodiment shown. A second by-pass 99 having a pressure relief valve 100 therein leads from the outlet of the pump back to sump 51, the valve 100 being regulated to open when the pressure in the system exceeds a value of 600 pounds per square inch. In addition to the foregoing, the fluid system includes a pipe 102 communicating with the outlet of pump 52 and a pipe 103 connected to pipe 102 and leading to return cylinder 42, the pipe 102 having a main valve 104 therein for controlling fluid flow to cylinder 42. The system further includes a return pipe 106 having an auxiliary valve 107 therein and leading from pipe 102 back to the sump 51. Moreover, a third by-pass 108 is provided leading from pipe 102 back to the sump 51, through pipe 99, the by-pass having a pressure relief valve 109 therein.

With reference to the foregoing connections, it will be observed that when it is desired to compress the filter bags, main pressure valve 92 in line 90 is opened and valve 97 in by-pass 96 is also opened. At the same time auxiliary valve 93 in return pipe 94 is closed. Moreover, the main valve 104 in the line leading to return cylinder 42 is closed while auxiliary valve 107 in the return pipe 106 from cylinder 42 is opened. Starting of pump 52 will cause the flow of fluid from sump 51 to the pressure cylinder 41 and since the pressure relief valve 98 in by-pass 96 is regulated to open on pressures in excess of 400 pounds per square inch and close at 400, a pressure of 400 pounds per square inch is maintained in the line to cylinder 41. Upon reaching a stage of operations where it is desired to step up the pressure to 600 pounds per square inch, or the capacity of the line, it is only necessary to close by-pass valve 97. If pressure builds up greater than 600 pounds, pressure relief valve 100 opens to relieve the pressure through by-pass 99 to the sump.

Upon the completion of compressing operations, and for returning the follower 29 and press boards 18 to initial positions for a re-fill, the operator need only close main valve 92 leading to pressure cylinder 41, open valve 93 in return pipe 94, open the main valve 104 for delivering fluid to the return cylinder 42 and close return valve 107 in return pipe 106. The relief valve 109 is regulated to open under fluid pressure value in excess of 50 pounds per square inch so that a pressure of the stated value is maintained in the system when delivering fluid to return cylinder 42. After refilling the filter bags, the foregoing operations are repeated for shifting the fluid flow to pressure cylinder 41 after, of course, opening valve 107 and closing valve 104. The system is so arranged with pressure relief valves that there is no likelihood of injury to workmen or damage to the press whatsoever.

It is to be understood that the appended claim is to be accorded a range of equivalents commensurate in scope with the advance made over the prior art.

I claim:

In a filter press including a frame, a plurality of flexible filter bags arranged in alternation with a plurality of rigid, slidably and pivotally mounted press-boards, and a movable follower for engaging an end press-board, mechanism for compressing said filter bags between said press-boards and for returning said bags and said press-boards to an initial position, said mechanism consisting of a first cylinder supported adjacent one end of said frame, a piston movably mounted in said first cylinder, a pair of pulleys mounted for rotation on said piston in juxtaposition, a first pair of cables trained over said pulleys, one of said cables being connected to one side of said frame and the other end of said one cable being connected to said follower on the opposite side of said frame, and one end of the other of said cables being connected to the other side of said frame and the other end thereof being connected to the follower on the opposite side of said frame, means for moving said piston out of said first cylinder to draw said follower through the medium of said pair of cables and thereby compress said filter bags between said press-boards; movement of said follower effecting the tilting of said press-boards about their horizontal axes so that they follow the contour of said bags, and a second cylinder supported adjacent said frame at the opposite end to said first cylinder, a piston movably mounted in said second cylinder, a pair of pulleys rotatably mounted on said last mentioned piston in juxtaposition, a second pair of cables trained over said last mentioned pair of pulleys, one end of one of said cables of said second pair being anchored to a support on one side of said second cylinder and the other end thereof being connected to said follower on the opposite side of said frame, and one end of the other of said cables of said second pair being anchored to a support on the opposite side of said second cylinder and the other end of said last mentioned cable being connected to said follower on the other side of said frame; movement of said piston out of said second cylinder operating to draw said follower and said press-boards back to their initial positions through the medium of said last mentioned pair of cables.

ROY EDWARD HARRIS.